US010616040B2

(12) United States Patent
Huang et al.

(10) Patent No.: US 10,616,040 B2
(45) Date of Patent: Apr. 7, 2020

(54) MANAGING NETWORK ALARMS (71) Applicant: Telefonaktiebolaget LM Ericsson (publ), Stockholm (SE)

(72) Inventors: Vincent Huang, Sollentuna (SE); MingXue Wang, Athlone (IE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 177 days.

(21) Appl. No.: 15/767,746

(22) PCT Filed: Nov. 10, 2015

(86) PCT No.: PCT/SE2015/051194
§ 371 (c)(1),
(2) Date: Apr. 12, 2018

(87) PCT Pub. No.: WO2017/082782
PCT Pub. Date: May 18, 2017

(65) Prior Publication Data
US 2018/0295014 A1   Oct. 11, 2018

(51) Int. Cl.
*G06F 15/173* (2006.01)
*G06F 15/16* (2006.01)
*H04L 12/24* (2006.01)

(52) U.S. Cl.
CPC ...... *H04L 41/0631* (2013.01); *H04L 41/0604* (2013.01); *H04L 41/142* (2013.01)

(58) Field of Classification Search
CPC .......... H04L 41/0631; H04L 41/142; H04L 41/0604

(Continued)

(56) References Cited

U.S. PATENT DOCUMENTS 6,239,699 B1   5/2001  Ronnen
6,892,163 B1   5/2005  Herzog et al.
(Continued)

OTHER PUBLICATIONS

Wu, Y. et al., Mining Alarm Database of Telecommunication Network for Alarm Association Rules, Conference paper, 11th Pacific Rim International Symposium on Dependable Computing (PRDC'05), Dec. 12, 2005, pp. 1-6.

(Continued)

*Primary Examiner* — Karen C Tang
(74) *Attorney, Agent, or Firm* — Patent Portfolio Builders, PLLC (57) ABSTRACT

The invention relates to a network node and a method for handling alarms in a communications network. The method comprises, for a set S of alarms collected in the communications network during a time period T: —obtaining a first and a second type of alarms and their time of arrival from the set; and applying Kernal Density Estimation on the respective first and second type of alarms, by applying a distribution function to each occurrence of the first and second type of alarms; thus obtaining a respective distribution function for the first and second type of alarms over the time period T. The method further comprises determining a maximum correlation between the distribution function for the first type of alarms and the distribution function for the second type of alarms, and determining the time shift between the distribution functions associated with the maximum correlation; and obtaining an indication of a mutual relation between the first and second type of alarms based on the maximum correlation and the time shift. The method further comprises comparing the obtained indication with at least a first threshold, and managing the alarm types based on the comparison.

19 Claims, 10 Drawing Sheets (58) Field of Classification Search
USPC .................................................. 709/224, 227
See application file for complete search history.

(56) References Cited

U.S. PATENT DOCUMENTS

| | | | |
|---|---|---|---|
| 7,389,345 | B1 | 6/2008 | Adams |
| 8,069,370 | B1 | 11/2011 | Li et al. |
| 2009/0262650 | A1 | 10/2009 | Shaikh et al. |
| 2010/0174945 | A1 | 7/2010 | Watanabe et al. |
| 2011/0128150 | A1* | 6/2011 | Kanga ............... G08B 13/19669 340/541 |
| 2013/0085715 | A1 | 4/2013 | Lakshminarayan et al. |
| 2013/0245401 | A1* | 9/2013 | Estes .................. A61B 5/14532 600/309 |
| 2014/0025998 | A1 | 1/2014 | Schimmelpfeng et al. |
| 2014/0215053 | A1* | 7/2014 | Marwah .................. H04L 12/28 709/224 |
| 2014/0337971 | A1* | 11/2014 | Casassa Mont ...... G06F 21/552 726/22 |
| 2015/0281453 | A1* | 10/2015 | Maturana ............ H04M 3/5233 379/265.12 |
| 2015/0285896 | A1* | 10/2015 | Hall ..................... H04W 4/029 340/539.13 |
| 2015/0378361 | A1* | 12/2015 | Walker ................ G05D 1/0206 701/21 |
| 2016/0292895 | A1* | 10/2016 | Billi ........................ G06T 11/60 |
| 2016/0314255 | A1* | 10/2016 | Cook ..................... G06N 20/10 |
| 2017/0076206 | A1* | 3/2017 | Lastras-Montano ........................ G06F 16/3344 |
| 2017/0099309 | A1* | 4/2017 | Di Pietro ............ H04L 63/1425 |
| 2017/0160734 | A1* | 6/2017 | Masse ................ G05B 23/0235 |
| 2017/0161625 | A1* | 6/2017 | Jannson ................. G06N 7/005 |
| 2017/0178161 | A1* | 6/2017 | Bendel ................ G06Q 30/0202 |
| 2018/0006913 | A1* | 1/2018 | Asenjo ................... H04L 67/10 |

OTHER PUBLICATIONS

Yang F., et al., Improved correlation analysis and visualization of industrial alarm data, ISA Transactions, vol. 51, Issue 4, Jul. 1, 2012, pp. 499-506, Elsevier.

Control Arts Inc., Alarm System Engineering, Chapter 1, created Sep. 28, 2007, obtained on Aug. 20, 2016, obrained from internet: http://controlartsinc.com/Support/Articles/Aiarm%20System%20Engineering.pdf, pp. 1-46.

International Telecommunication Union, The International Telegraph and Telephone Consultative Committee, Data Communication Networks, Information Technology—Open Systems Interconnection—Systems Management: Alarm Reporting Function, Feb. 10, 1992, pp. 1-24, ITU.

* cited by examiner

MANAGING NETWORK ALARMS

TECHNICAL FIELD

The invention applies to alarms in communication networks, and in particular to management of such alarms.

BACKGROUND

One important purpose of generating alarms in communication networks is to alert the network operator of deviations from normal operating conditions. Alarms are one type of network event. Network alarms can be e.g. so-called "absolute alarms", triggering when system parameters reach a certain value; or they can be so-called "delta alarms", triggering when one or more system parameters changes a certain level measured per time interval, such as e.g. the throughput. Network alarms are notifications of possible or actual network problems. It provides important network information for network operators to monitor and resolve network issues.

However, since network systems often are large and complex, it is common that a network operator receives, and need to consider, hundreds of even thousands of alarms from a managed network. According to an example of a real network statistics, a network generates in average about 60 000 alarms every day from different levels of network elements. This absolute flood of alarms creates some major problems for network management. For example:

The network must be able to handle the large amount of alarm data being communicated in the uplink/upstream, and towards a management node.

Investigating and resolving large numbers of different types of alarms separately is difficult and time consuming, and results in longer impacts for network users.

It is often impossible for operators to handle the huge amount of received alarms manually to resolve network issues.

The current common approach to handle the flood of alarms is utilizing alarm filtering functions of a so-called Fault Management (FM) system in an Operations Support System (OSS). FM in OSS refers e.g. to the handling of notifications sent by a network element or service when there is any error or fault at the network element or in the communication between the OSS and the network element. The basic purpose of FM in OSS is to receive, process, persist, display and communicate errors/alarms to other systems. The alarm filtering feature allows applying of filters before alarms are passed on to other consumers in the OSS or outside of the OSS.

Complex filtering and association analysis are two major approaches developed for handling the flood of alarms in current network management systems.

The filtering approach allows a system to automatically filter out specified or identified alarms with an updated alarm representation, and thereby e.g. reduce the number of alarms represented and/or presented to operators. Different filtering techniques can be used depending on alarm types [2] [3]. For example, a frequency-based filter can be used to identify an alarm exceeding a threshold value a certain number of times within a certain period of time.

The association analysis approach allows a system to automatically combine alarms with strong association to reduce number of alarms. The basic concept is utilizing so-called association rule mining techniques to discover alarm relationships based on statistics of how often alarms occurred together [4]. For example, a stronger relationship will be given if two alarms always, or at least often, occur together.

Current FM systems generally offer alarm filtering features to filter out alarms based on alarm attributes. This allows human experts to define alarm filter rules, and thereby a significant amount of alarms presented to operators can be reduced. For example, alarms for some network services, or alarms associated with certain problems, could be filtered out. Further frequency-based filters could also be added. However, such systems still failes when it comes to allowing the operator to respond quickly and accurately to the alarms that require immediate actions. Two main problems are:

1. Manually defined expert rules are required and they are not flexible and adaptive. Manually defined rules are completely dependent on engineers' or experts' knowledge on the current network system. This static approach is not flexible and adaptive for the dynamics of networks. For example, when a network is reconfigured, new alarms or alarm logics are introduced, and such static rules do not have the required knowledge for handling the network changes.
2. Different types of alarms have to be investigated separately, even if they are caused by the same fault. Since a network system is typically complex and interconnected, a single network problem might affect hundreds of network elements or services, resulting in thousands of alarms of different types. Filtered alarms of different types still need to be investigated separately by operators. It is often extremely difficult for operators to understand the root cause, and find the significant alarms for a specific root cause.

Association rule analysis is an adaptive approach which does not require static rules. Associations, such as alarm relations can be automatically learnt from historic alarm data. Also when the network is changed, such as at topological structure changes, the system can learn updated alarm associations from newly collected alarm history. However, one major problem for association analysis is the handling of constant noise alarms.

Some alarm types may occur every few seconds or minutes, thereby generating noise in the alarm data. The problem may be due to that the network issues causing these alarms are not significant enough to be fixed, or to that systems automatically does periodic checking, which triggers the same alarms each time, etc. However, co-occurrence count based association analysis will give that these noise-generating alarms have some relationship with all other alarms, since it occur every time when other alarms occur. As a consequence, this results in inaccurate alarm relations for constantly or frequently occurring alarms.

Consequently, none of the existing approaches is considered sufficient when it comes to handling of and analysis of network alarms.

SUMMARY

A new, improved technology for managing network alarms is desired. This is achieved by the solution as described herein, and as defined by the appended set of claims. This improved technology facilitates network management for operators of communication networks.

Herein, a method for finding latent relations among alarms based on time series correlation coefficients is suggested. The method may comprise a training phase, where calculation are made based on historical alarm data. Based on the arrival rates of the alarms, a density estimation function estimates the probability an alarm will appear as a function of time. The density function is then used by the correlation function to find the relations among alarms. Embodiments of the suggested solution may be configured to be self-learning and adaptive. The solution does not require defining of static or expert rules for the system.

According to embodiments of the solution described herein, alarms relations are found by numerical, equal length density estimation based correlation rather than co-occurrence count based approaches, such as association mining based. Thereby, the suggested solution has a better ability to handle noisy alarms or alarms occurring constantly (or at least very frequently), as compared to prior art methods.

Applying embodiments of the invention enables that different types of alarms having strong relations could be investigated and resolved together, which saves time and labor, as compared to handling large volumes of alarms separately.

The solution enables to dynamically establish and update relations among the system alarms.

According to a first aspect, a method for handling alarms in a communications network is provided, which is to be performed by a network node. The method comprises, for a set S of alarms collected in the communications network during a time period T: obtaining a first and a second type of alarms and their time of arrival from the set. The method further comprises applying Kernal Density Estimation on the respective first and second type of alarms, by applying a distribution function to each occurrence of the first type of alarms; thus obtaining a respective distribution function for the first type and the second type of alarms over the time period T. The method further comprises determining a maximum correlation between the distribution function for the first type of alarms and the distribution function for the second type of alarms, and determining the time shift between the distribution functions associated with the maximum correlation; and obtaining an indication of a mutual relation between the first and second type of alarms based on the maximum correlation and the time shift. The method further comprises comparing the obtained indication with at least a first threshold, and managing the alarm types based on the comparison.

According to a second aspect, a network node is provided for handling alarms in a communications network. The network node is configured to obtain a first and a second type of alarms and their time of arrival from a set S of alarms collected in the communications network during a time period T; and further to apply Kernal Density Estimation on the first and second type of alarms, by applying a distribution function to each occurrence of the first and second type of alarms; thus obtaining a respective distribution function for the first type of alarms over the time period T. The network node is further configured to determine a maximum correlation between the distribution function for the first type of alarms and the distribution function for the second type of alarms, and to determine the time shift between the distribution functions associated with the maximum correlation; and further to obtain an indication of a mutual relation between the first and second type of alarms based on the maximum correlation and the time shift. The network node is further configured to compare the obtained indication with at least a first threshold; and to manage the alarm types based on the comparison.

According to a third aspect, a computer program is provided, comprising instructions which, when executed on at least one processor, cause the at least one processor to carry out the method according to the first aspect.

According to a fourth aspect, a carrier is provided, which contains a computer program according to the third aspect.

BRIEF DESCRIPTION OF THE DRAWINGS

The foregoing and other objects, features, and advantages of the technology disclosed herein will be apparent from the following more particular description of embodiments as illustrated in the accompanying drawings. The drawings are not necessarily to scale, emphasis instead being placed upon illustrating the principles of the technology disclosed herein.

FIGS. 3$a$-3$d$ show density estimation of four alarm types according to exemplifying embodiments, each figure showing a distribution function of an alarm type.

FIGS. 9$a$-9$c$ illustrate different implementations of a wireless device according to exemplifying embodiments.

DETAILED DESCRIPTION

Self-learning based automatic grouping of alarms is highly desired in future network management systems. For example, it would be very beneficial if all alarms related to a single incident could form the incident information. To find relations between alarms is an important step of alarm grouping.

As previously stated, large volumes, i.e. "a flood" of network alarms are constantly received by network operators. Since communication networks are interconnected complex systems, a very large volume of different types of alarms will be generated when a fault occurs in the network. Therefore, a large part of the generated alarms do not represent or indicate the root cause of the problems. Thus, if relations between these alarms could be found, and alarms relating to the same root cause could be put in a single representation, this would give great benefits for manual or automatic network troubleshooting and/or for handling of the actual faults. Finding alarm relations is identified as an important task in advanced network management for handling the flood of alarms. One possible benefit of grouping alarms based on their relations could be facilitating the finding of a root cause, as described above.

Below, exemplifying embodiments of the solution presented herein will be described with reference to the accompanying figures.

Figure 1:
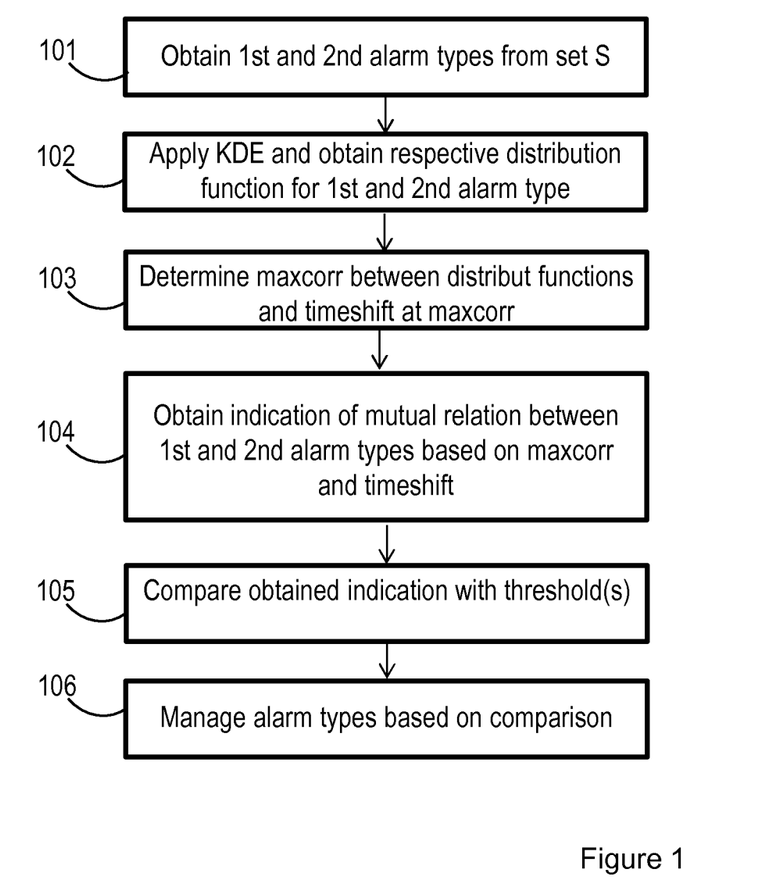
FIG. 1 is a flow chart showing a method performed by a network node according to an exemplifying embodiment.

FIG. 1 shows a method for handling alarms in a communications network. The method is to be performed by a network node or unit, e.g. in a network management system. The method comprises obtaining 101 a first type and a second type of alarms and their time of arrival from a set S of alarms collected in the communications network during a time period T. The method further comprises applying 102 Kernal Density Estimation on the respective types of alarms, by applying a distribution function to each occurrence of the first and second type of alarms; thus obtaining a respective distribution function for the first and second type of alarms over the time period T. The method further comprises determining 103 a maximum correlation between the distribution function for the first type of alarms and the distribution function for the second type of alarms, and further determining 103 the time shift between the distribution functions associated with the maximum correlation. The method further comprises obtaining 104 an indication of a mutual relation between the first and second type of alarms based on the maximum correlation and the time shift. The method further comprises comparing 105 the indication with at least a first threshold and managing 106 the alarm types based on the comparison.

The set of alarms collected in the communications network during a time period T may be comprised e.g. in an alarm log of historical alarms. The obtaining of an alarm type may refer e.g. to deriving, retrieving or selecting a certain type of alarms from the set. The mutual relation between the alarm types, of which an indication is obtained, may be referred to as a latent alarm relation herein. The method illustrated in FIG. 1 is typically repeated for additional types of alarms, i.e. the method may be performed for more than two types of alarms. Parts of the method may be iteratively operated for different time periods Ti. For example, an obtained indication for alarms in a first period T may be updated based on an indication obtained for a second period T2. The method of applying Kernal Density Estimation by applying a distribution function to each occurrence of different types of alarms may be applied for many different types of alarms, and indication of mutual relation between pairs of these different types of alarms may be obtained, which will be described in further detail below.

Figure 2:
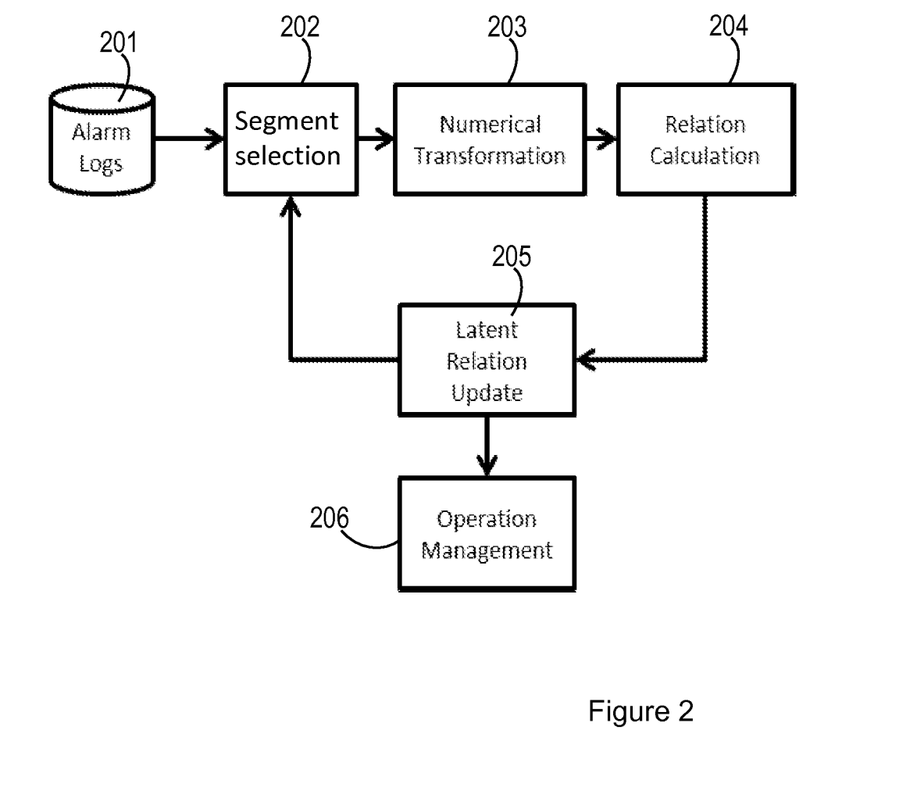
FIG. 2 is a flow chart showing a process according to an exemplifying embodiment.

The indication(s) of latent alarm relations may be derived from historical recorded alarm logs. In an exemplifying embodiment, illustrated in FIG. 2, the data from such a log 201 is divided 202 into time periods Ti e.g. with a fixed time period length. These time periods Ti may be referred to as "windows" herein, but it should be noted that this is not windows in the same sense as used within e.g. association analysis. While the windows used for association analysis are typically measured in terms of seconds, the time periods Ti, described herein, typically have a duration in term of hours, or even days. For the alarms in each time period Ti, sub-sets of alarms are derived based on one or more selected alarm properties (each alarm being associated with at least one property). Examples of alarm properties will be given below. The alarms in such a sub-set may be referred to as belonging to a certain alarm type herein. For example, when deriving sub-sets based on only one property, such as e.g. a property "node", the different sub-sets (or alarm types) may comprise alarms having the same "case" or "value" of the selected property, e.g. a first sub-set may consist of alarms having the value MME17 of the property "node". Further, each alarm occurrence in the alarm log and/or in the network is associated with a time stamp indicating e.g. when the alarm was triggered or received. Based on the information of these timestamps, the density estimation may be performed 203 or 204 for sub-sets derived from a time period Ti. The density estimation for a sub-set provides how likely it is that an alarm of the sub-set alarm type is received as a function of time. Based on the density functions, correlation coefficients can be calculated 204 for each pair of sub-sets. When each sub-set represents a different value of a selected property, correlation coefficients can be calculated for all combinations of values of the selected property. The correlation coefficients give an indication on the alarm relations. A register or other representation, e.g. a matrix, of the relations between alarm types or sub-sets may be updated based on the result of the calculations 204. The procedure may be repeated for a plurality of time periods Ti. The results from each time period can either be combined or e.g. stored separately as time-series variations.

An alarm may contain or be associated with a number of different information data fields or properties. Such information data fields or properties may be specified e.g. in existing standards or protocols, such as X.733 [1]. One or many of these properties can be used for the alarm relation finding solution described herein. The following list shows some examples of possible alarm properties and their different cases, i.e. "values" or representations:

Probable cause
   Error codes
Specific problems
   {"Active Function Failed", "ANALYSIS DATA FAULT","AP DIAGNOSTIC FAULT", "AP FAULT", "APPLICATION DETECTED SOFTWARE ERROR", "Application Not in Service", "AUDIT FUNCTION THRESHOLD SUPERVISION", "Automatic CV Creation Failed", etc.}
Additional text
   {"Notification IRP is NOT working: Failed to resolve Notification IRP\\n-ProbableCause(OSS)=LAN Error/Communication Error", "The alarm is currently toggling.", etc.}
Managed Object
   {"SubNetwork=ONRM_ROOT_MO, SubNetwork=AXE,ManagedElement=BSC11",
   "SubNetwork=ONRM_ROOT_MO, SubNetwork=AXE,ManagedElement=BSC11",
   "SubNetwork=ONRM_ROOT_MO, SubNetwork=AXE,ManagedElement=BSC11, BssFunction=BSS_ManagedFunction, BtsSiteMgr=LOC_0009", etc.}

Alarm properties of alarms in a communication network are normally described in text format. One network incident or problem can generate a number of different types of alarms of which some may appear after a time lag, i.e. it takes a while until these alarms are triggered, although they are caused by the same network incident. Finding a relation or correlation for alarms in text representation is difficult. According to exemplifying embodiments of the invention, each alarm, at least of the desired alarm types, is transformed, i.e. converted, into a numerical variable with a certain length, the length being equal for different alarms. Many different methods could be used for transforming text into numerical values. One possible solution is to use the density estimation function as such a numerical variable. One example could be that for input alarm data comprising a number, X, of "LinkFailure" type alarms which occurred 1 Jul. 2014, in a 24 hour time period (explicitly specified only between 03:26:08 and 03:26:11), as:

. . .

"2014-07-01 03:26:08";"LinkFailure"
"2014-07-01 03:26:09";"LinkFailure"
"2014-07-01 03:26:11";"LinkFailure"

. . .

For these input data, the output data after transformation from text to numerical values using a density function may be a fixed size of numeric array for the type of alarm, e.g. as:

(0.009880529, 0.010805675, 0.011824514, 0.012903629, 0.015359492, . . . )

Figure 3A:
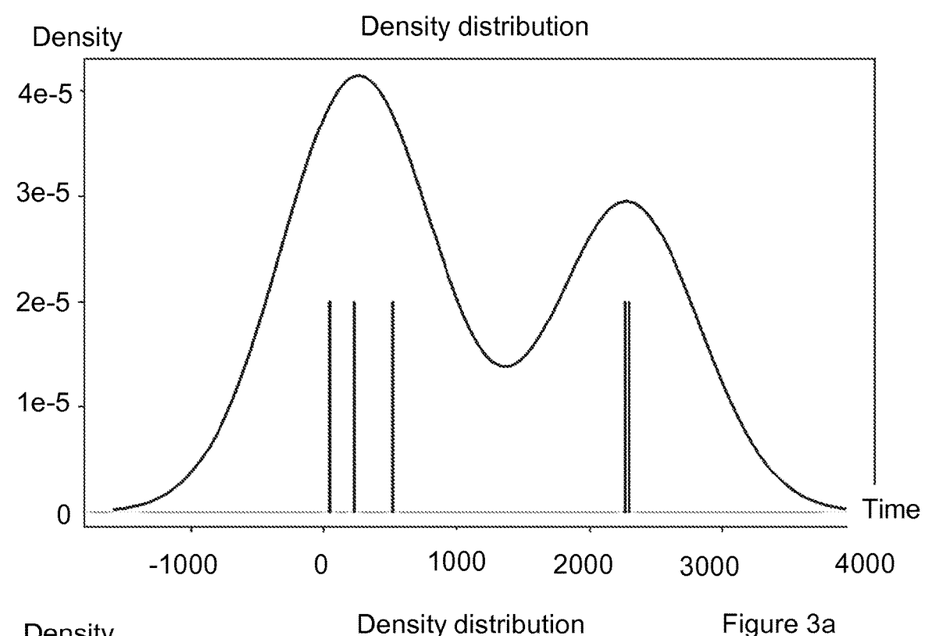
Figure 3B:
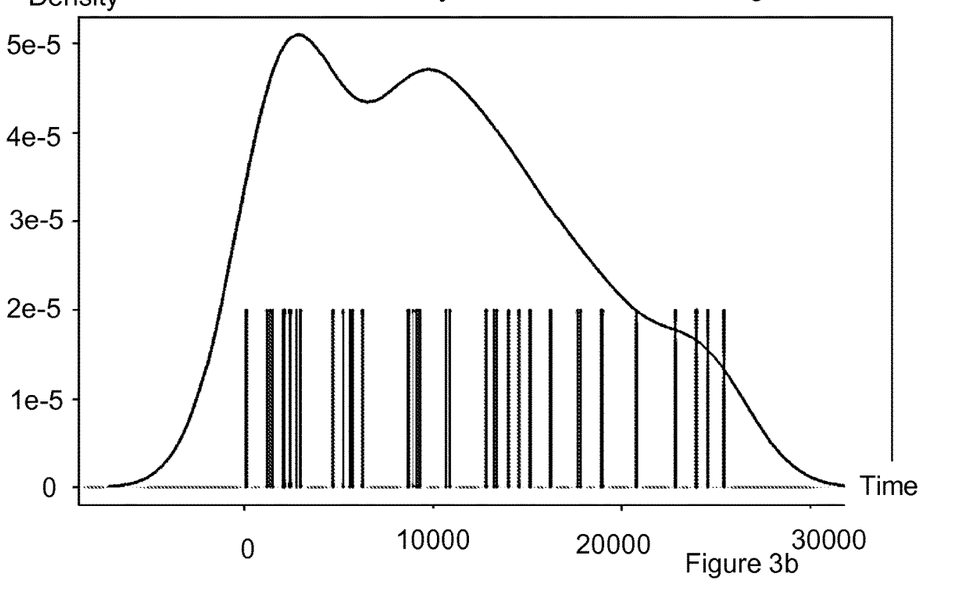

This numeric array denotes the probabilities of the "Link-Failure" alarm occurrence from the beginning to the end of the day (1 Jul. 2014). The density estimation function used to obtain the numeric array is described in the following paragraph. As a result, we could have same size numeric arrays also for other types of alarms. FIGS. 3a and 3b are plots of two numeric arrays exemplifying two different types of alarms. Representing different types of alarms with same size numeric arrays enables us to calculate correlations of different types of alarms at a late stage.

Figure 3C:
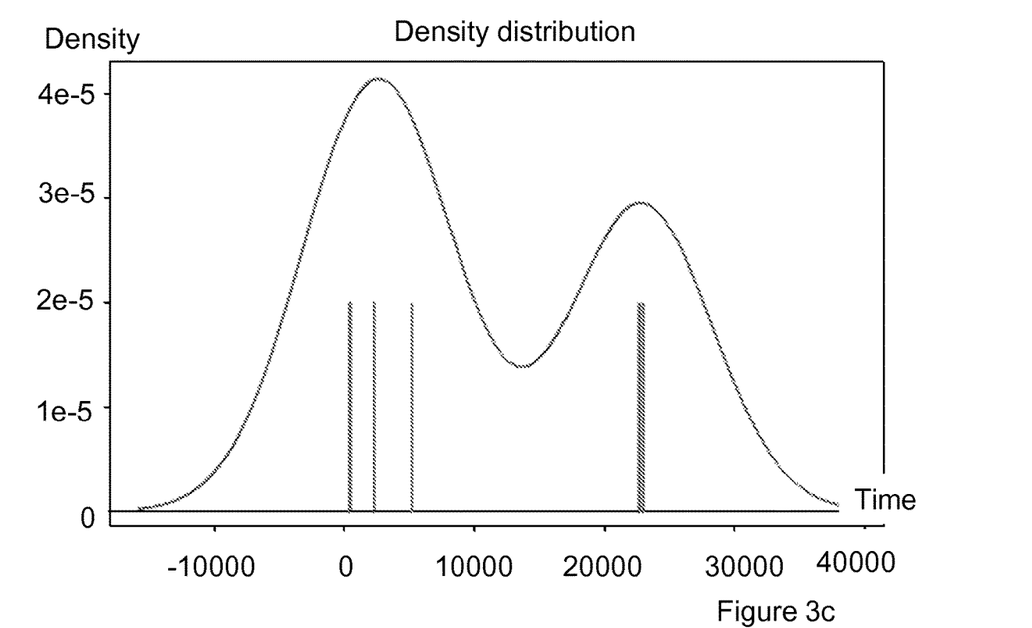
Figure 3D:
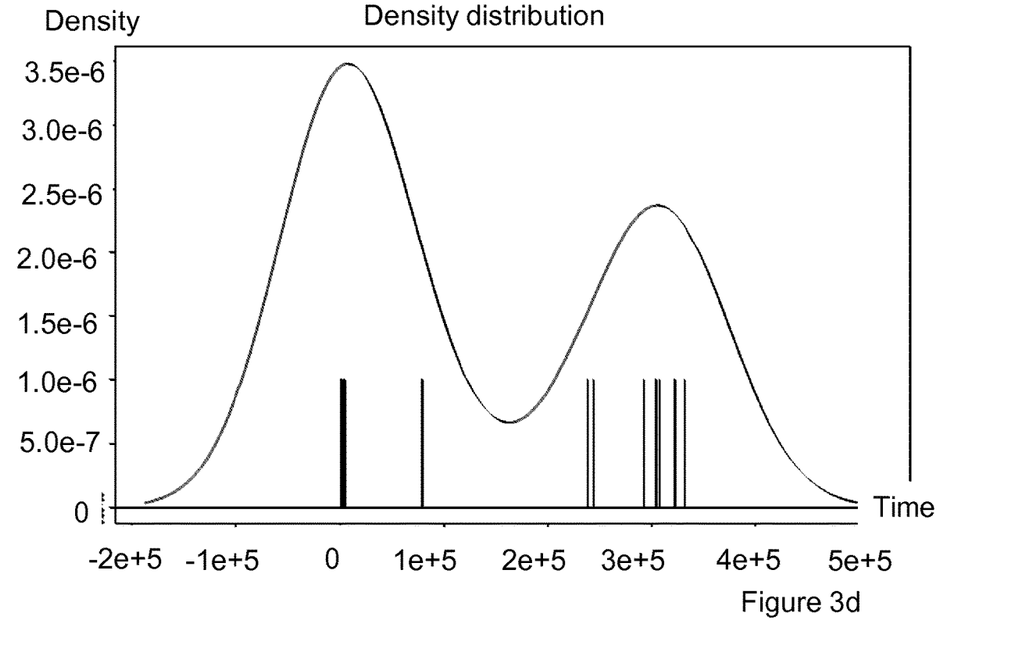
Figure 4:
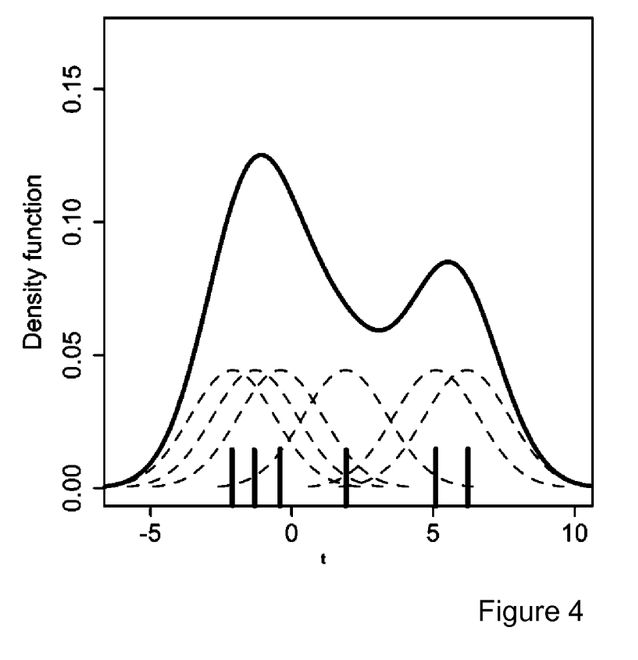
FIG. 4 shows applying of a Gaussian distribution function to each occurrence of an alarm of a certain alarm type during a time period according to an exemplifying embodiment.

FIGS. 3a and 3b show the density estimation for two exemplifying types of alarms. The density estimation functions show the normalized number of alarms of each type that is expected at each time point. Vectors of the same length are generated for all alarm types, no matter how many alarms that are received during the time period in question. Therefore, the density estimation functions, or vectors, are easy to process and compare. FIGS. 3a and 3b show two different alarm types and their respective density estimation function. As indicated in the respective figures, each function have different shape, and the correlation between them is likely to be small. When density estimation functions of two alarm types instead have similar shapes, e.g. as the ones shown in FIGS. 3c and 3d, but appear at different times, they can be correlated with a time shift between them. One approach to obtain the density estimation is Kernel Density Estimation (KDE) with a Gaussian kernel. As shown in FIG. 4, for the selected time interval, e.g. T, whenever an alarm arrives, a Gaussian distribution function is generated around the time point when the alarm is received. This point in time may be derived from the timestamp associated with the alarm occurrence. Alternatives to a Gaussian kernel could be e.g. uniform, triangular, biweight, triweight, Epanechnikov, or a normal kernel, i.e. probability distribution function. The normalized sum of all Gaussian distributions is the density estimation. The density estimation gives an indication how a particular type of alarms are distributed over the time interval.

$$\hat{f}_h(x) = \frac{1}{n} \sum_{i=1}^{n} K_h(x - x_i)$$

Where, K(.) is the kernel function and h is a smoothing parameter.

Figure 5:
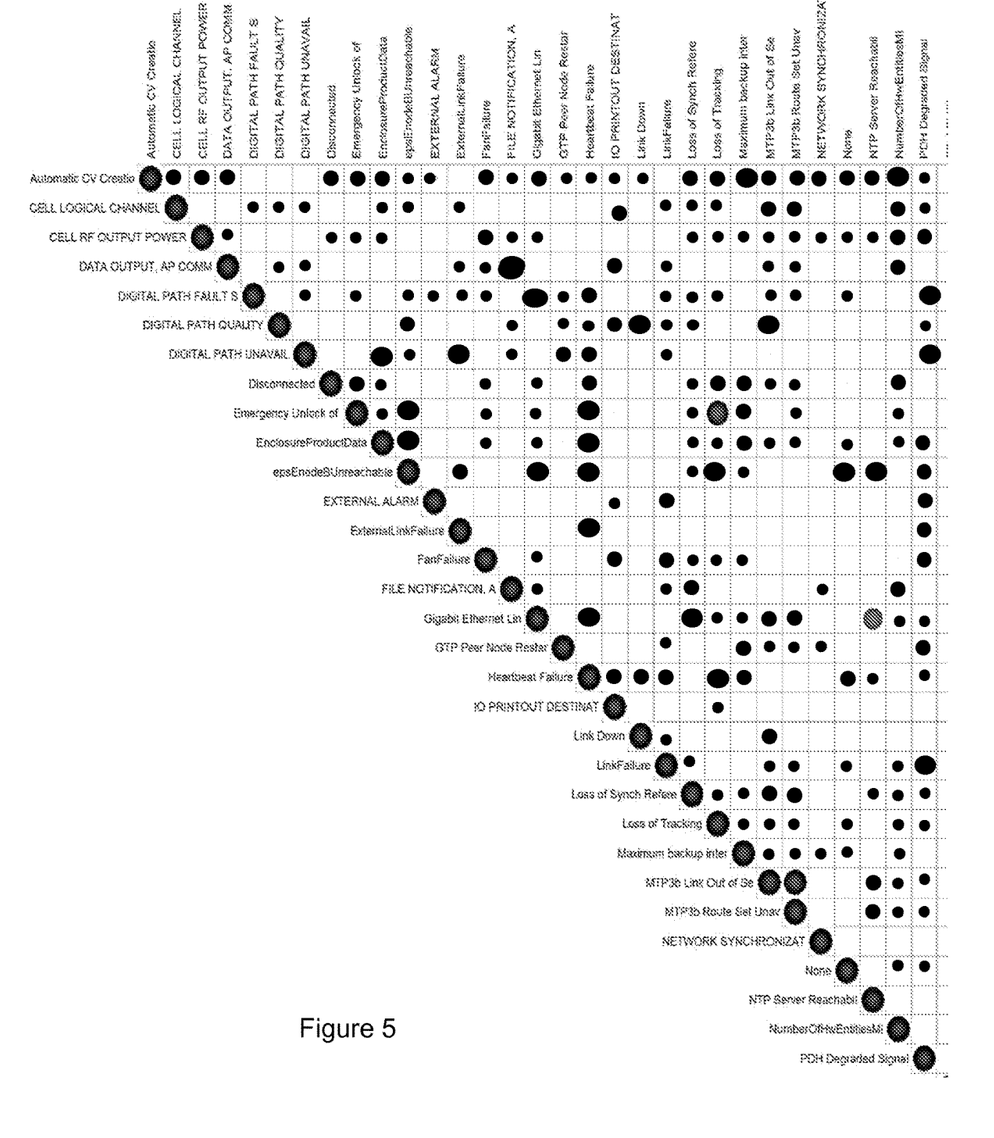
FIG. 5 shows cross correlation coefficients (dots) in a correlation matrix of a plurality of alarm types, according to an exemplifying embodiment

FIG. 5 shows exemplifying correlation matrixes of all alarm data for a selected property. A darker color indicates higher probability that the alarms will be received at the same time. The figure illustrates how a correlation matrix could be constructed. The text on the diagonal and the upper horizontal axis represents different alarm types, in this specific example defined as the alarm property "specific problem". Examples of specific problems indicated in the "specific problem" field of the text representation of the alarms in this example are e.g.: "Cell Logical Channel", "Cell RF Output Power", "Digital Path Fault S" and "Digital Path Quality".

The correlation coefficients between any two alarm properties may be calculated according the following formula:

$$r = \frac{\sum_{i=1}^{n} (x_i - \bar{x})(y_i - \bar{y})}{\sqrt{\sum_{i=1}^{n} (x_i - \bar{x})^2} \sqrt{\sum_{i=1}^{n} (y_i - \bar{y})^2}}$$

Where, x and y are representing different alarm types.

The relations between alarm types may change over time or changes for different contexts. Thus, it is desired that an obtained representation, such as obtained indications of the relations e.g. in a correlation matrix, as the one illustrated in FIG. 5, can be updated dynamically. One way to update an obtained representation of the relations is to use exponential weighted moving average. For example, correlation coefficients obtained or derived from historical data may be stored, and then be updated based on new values derived from more recent, e.g. newly received data. For example, whenever a new value of correlation coefficient is calculated for two alarm types, the stored value may be updated accordingly e.g. as:

$$r = \alpha r_{new} + (1-\alpha) r_{stored}$$

where $\alpha$ is a value between 0 and 1. A large $\alpha$ implies that the coefficient will be updated faster but in a less stable manner. A small $\alpha$ implies that the coefficient will be updated slower but in a more stable manner. If the change in alarm relations is just a temporary change, the effect will disappear gradually. If the change is more persistent, the coefficient will be successively be updated towards the new value. For example, for network wide alarms, the characteristics changes quite slowly, and thus, a more stable system may be desired for such alarms. For application level alarms, the characteristics may change faster, and thus it may be desired to adapt faster to the changes than for network wide alarms. In other words, it may be desired to give the most recent update a larger weight for application level alarms, as compared to wide area alarms.

Figure 6:
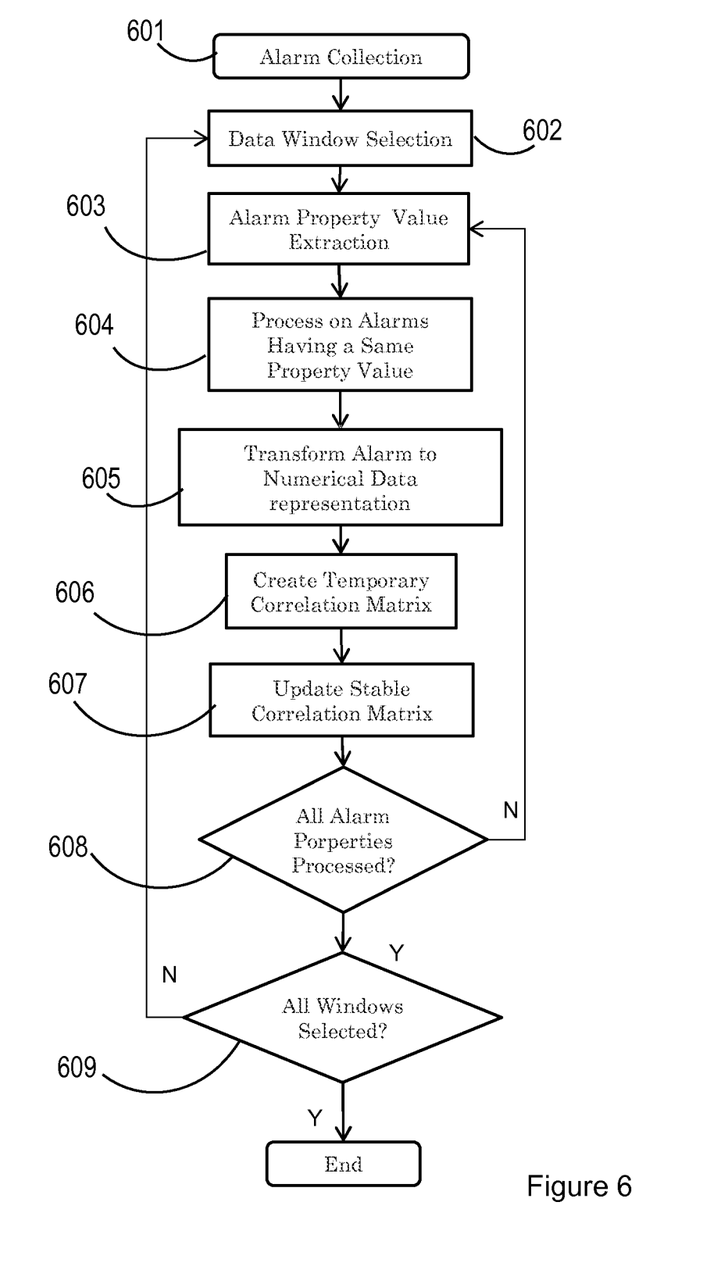
FIG. 6 is a flow chart showing a method performed by a network node according to an exemplifying embodiment.

According to embodiments of the solution described herein, alarm relations may be indicated, represented or stored as correlation matrixes. FIG. 6 shows an exemplifying flow diagram for correlation matrix training by using above described actions or functions. Network alarms are collected 601 as a data stream. The data stream is divided by time segments which could be denoted windows 602, with fixed length. The data in each window is handled separately.

The necessary or selected alarm properties' values are extracted 603 from the alarms. For each type of property values, we process on all alarm data transformed 604 into a numerical data series with uniform length. The technique is described in the above section that we use the density estimation function of alarm arrival time.

A temporary correlation matrix may be created 606, e.g. calculated or constructed, among all different alarm types representing the different cases/values of a same alarm property. This temporary matrix may be used to update 607 a stable correlation matrix for the alarm property. The process may be repeated for each property 608 and time period Ti (window) 609 until all data, e.g. in a historical alarm log or other set, is processed. A correlation matrix training procedure, or update procedure, could be performed e.g. daily.

The obtained indications of mutual relations between alarm types in a communication network may be used as a base for managing the alarms in the network. At least one obtained indication of a mutual relation between alarm types, or a representation thereof, is compared with at least a first threshold, and then alarm types are managed based on the result of the comparison. Managing the alarm types may refer to adapting the alarms based on the comparison or performing certain error recovery actions or troubleshooting based on the comparison. Examples of what could be comprised in managing the alarm types are given below.

Since decision criteria may be configured in different ways, herein, the expression "to meet a threshold" could mean being equal to the threshold or passing the threshold, either from below, i.e. exceeding the threshold, or from above, i.e. going below the threshold. It would depend on the formulation of the decision criteria which one or ones of these that will be adequate.

For example, a text representation of alarms of alarm types associated with an indication of a mutual relation that meets a first threshold could be renamed or redesigned, such that they have a common property, such as an identifier of a certain incident. Thereby, this incident could be detected faster in the future, and thereby be faster attended to.

Figure 7:
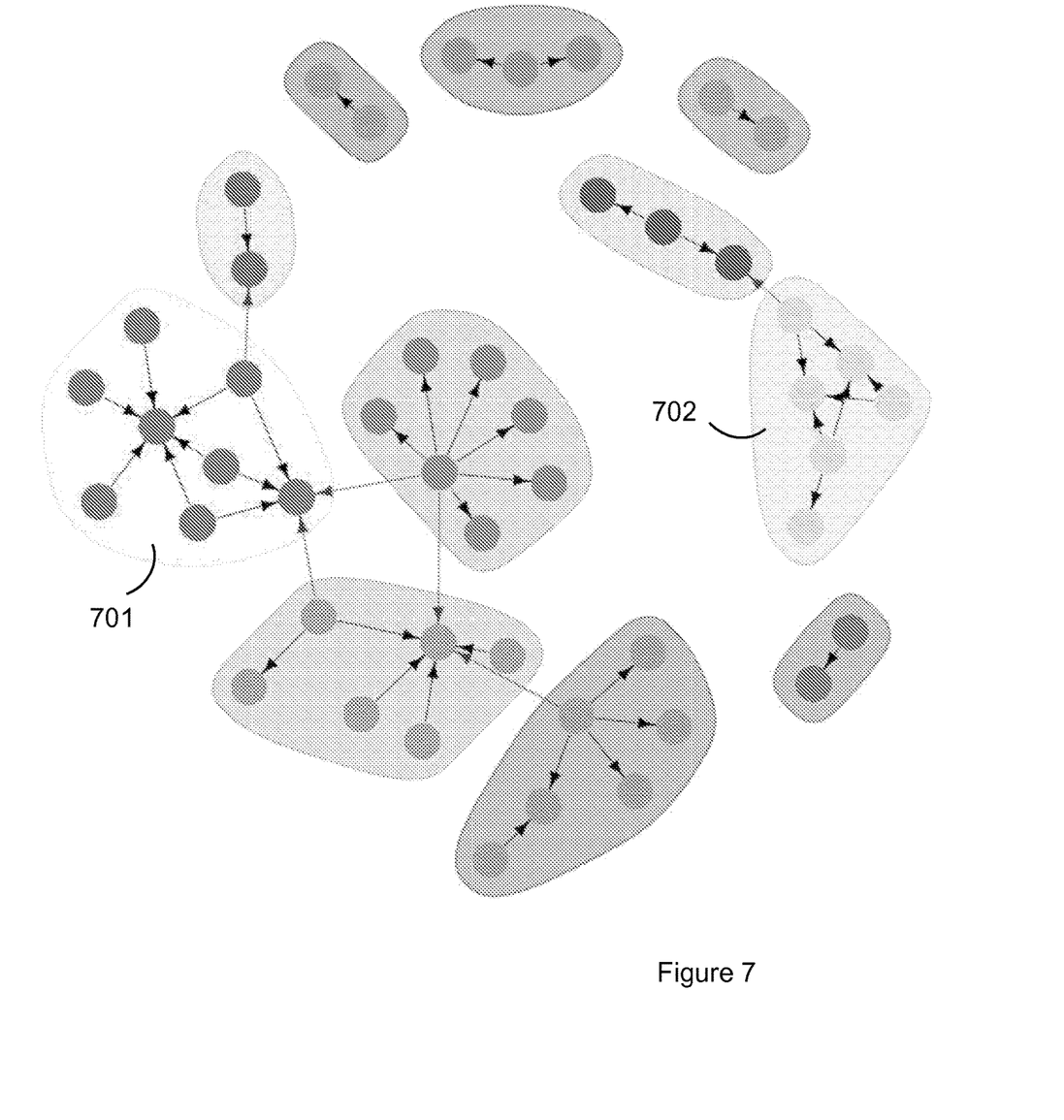
FIG. 7 is a diagram showing grouping of alarm types according to an exemplifying embodiment.

Grouping or clustering alarms having relations to reduce numbers of alarms directly presented to network operators. For example, alarm types associated with an indication of a mutual relation which meets a second threshold could be grouped. By grouping these alarms, a group of alarms may be obtained, which is indicative e.g. of a certain incident in the communication system. FIG. 7 illustrates grouping of alarms. The circles represent different alarm types. The grouping is based on the values of maximum correlation and time lag. FIG. 7 is based on experimental results, and as an example, the examples show that an alarm type with the property "Data output, destination Fault" could be grouped with an alarm type with the property "External Link Failure", among others in a group 701. Another example from the experimental data show that that an alarm type with the property "Fan Failure" could be grouped with an alarm type with the property "Service Unavailable", among others in a group 702. Alarms belonging to the same group are more likely to appear together. There are different algorithms which may be used for achieving the grouping based on the correlation data, e.g. "Edge-Betweenness", "Fast-Greedy", "Walktrap", "InfoMAP", etc. However, the choice of the algorithms is not part of this invention. The alarm types (dots/circles) in FIG. 7 are grouped together based on the strength of the relations or "links" between them. The different algorithms mentioned above use different cost functions to calculate the strength of the links. The connection between two alarm types may be derived from a cross-correlation value and a lag value, derived based on the solution described herein.

By discovering and understanding underlay relations between alarms, engineers can optimize alarm designs or network configurations. For example, some unnecessary alarms in alarm configurations of a network may be turned off as an outcome of the described process. This could be described as turning off alarms of alarm types found to be redundant, given an indication of a mutual relation that meets a third threshold.

By knowing alarm relations, a linked graph, such as the one illustrated in FIG. 7, just as social network graph can be built for alarms. Such a graph would help the network engineers e.g. to trace down root cause and troubleshooting. For example, a troubleshooting strategy may be selected based on at least one obtained indication that meets a fourth threshold. Further, if troubleshooting actions are known for certain alarms or groups of alarm types, then the system can recommend or automatically execute troubleshooting or other actions for unknown alarms based on relations with known alarms. In an exemplifying embodiment, a threshold for cross-correlation is set to about 0.6 and a threshold for lag is set to about 1200 seconds in order to create a linked graph and to group the alarm types with community detection algorithms. The alarms grouped together may be caused by the same underlying problem. When, during execution time or "run-time", a number of alarms from the same group are observed, trouble shooting related to a certain network problem associated with the group may be selected and applied. When alarms from two different groups are observed, it may be concluded that there are two different problems in the network. Thus, according to the example threshold values above, alarm types meeting the threshold values, e.g. having a cross-correlation which is equal to or exceeds 0.6 and a lag equal to or shorter than (below) 1200 seconds, may be grouped together.

Figure 8:
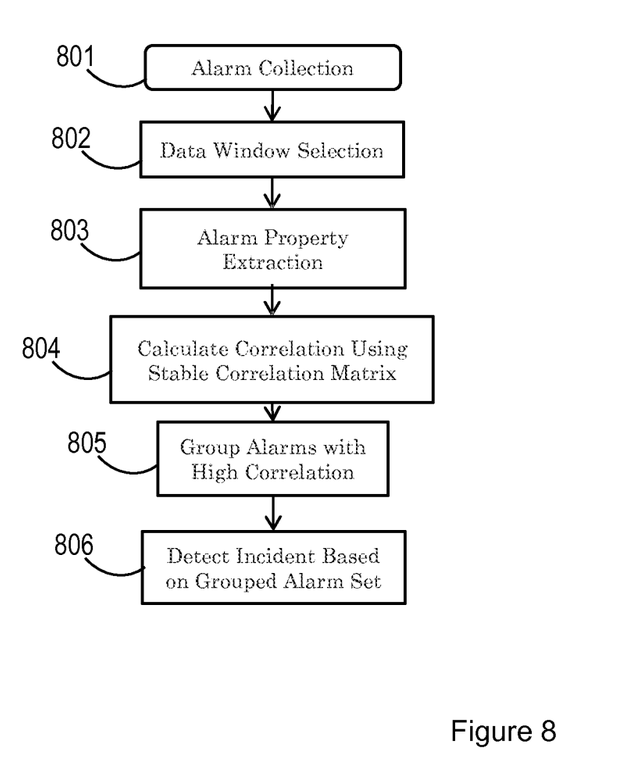
FIG. 8 is a flow chart showing a method performed by a network node according to an exemplifying embodiment.

FIG. 8 shows an exemplifying embodiment where alarm relations, or a correlation matrix, is used for incident detection. Here alarms may be collected 801 from an alarm data stream during operation. When analyzing a real time, alarm data stream, alarms may be analyzed or handled in time periods T, 802, of the same length as during the training phase. The observed alarm types are the same as during the training phase, i.e. having the same features and/or properties. However, not all alarms which appeared during the training phase may appear during operation time, and vice versa. The alarm types of alarms during operation time may be collected or derived 803 directly from the text representation of the alarms in the alarm data stream, and need not be transformed into numerical representation. The stable correlation matrix created during training, may then be used, e.g. as a look-up table, for deriving 804 correlation coefficients for e.g. any or each alarm property value between any two alarms, and thus derive a relation between the alarms. The values for all properties are combined together. If the combined correlation coefficient is larger than a threshold, the alarms are grouped 805 together into an alarm set. Based on the alarms in an alarm set, an incident description can be generated, and an incident can be detected 806.

The methods and techniques described above may be implemented in different ways, of which some will be described below.

Figure 9A:
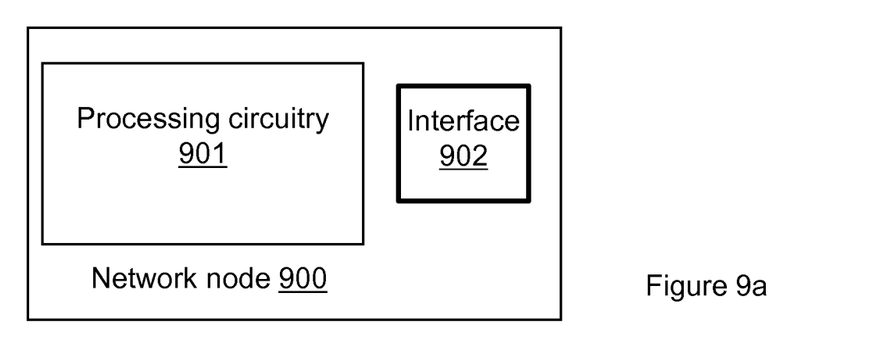

An exemplifying embodiment of a network node 900, such as the network node 102, is illustrated in a general manner in FIG. 9a. The network node 900 is configured to perform at least one of the method embodiments described above e.g. with reference to FIGS. 1-8. The network node 900 is associated with the same technical features, objects and advantages as the previously described method embodiments. The node will be described in brief in order to avoid unnecessary repetition.

The network node may be implemented and/or described as follows: The network node 900 comprises processing circuitry 901 and a communication interface 902. The processing circuitry 901 is configured to cause the network node 900 to obtain a first and a second type of alarms and their time of arrival from a set S of alarms collected in the communications network during a time period T, and further to apply Kernal Density Estimation on the respective first and second type of alarms, by applying a distribution function to each occurrence of the first type of alarms; thus obtaining a distribution function for the first type of alarms over the time period T. The processing circuitry 901 is further configured to cause the network node 900 to determine a maximum correlation between the distribution function for the first type of alarms and the distribution function for the second type of alarms, and determining the time shift between the distribution functions associated with the maximum correlation. The processing circuitry 901 is further configured to cause the network node 900 to obtain an indication of a mutual relation between the first and second type of alarms based on the maximum correlation and the time shift; to compare the obtained indication with at least a first threshold; to manage the alarm types based on the comparison, and to receive a plurality of service requests related to audio visual content, the requests originating from a number of devices. The processing circuitry 901 further configured to cause the network node to identifying a set of most frequently requested audio visual content, based on the plurality of service requests; and further to indicate the set of audio visual content to an indexing server. The communication interface 902, which may also be denoted e.g. Input/Output (I/O) interface, includes a network interface for at least sending data to and receiving data from other network nodes and an indexing server.

Figure 9B:
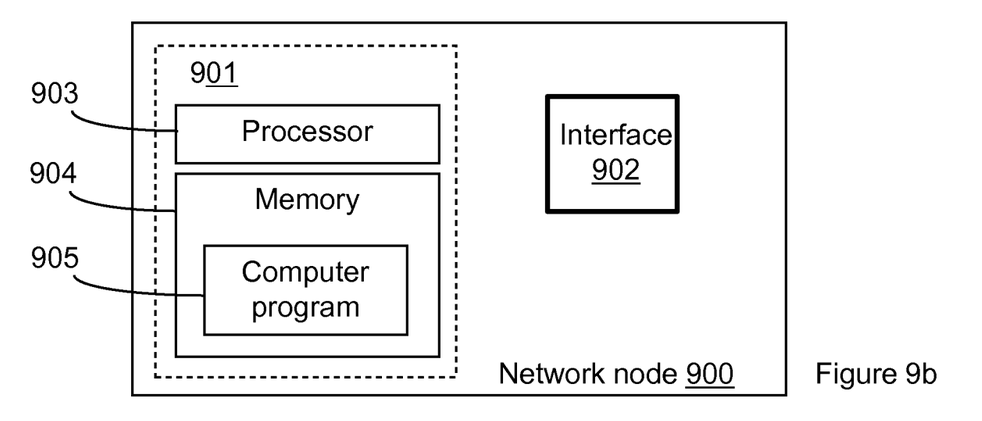

The processing circuitry 901 could, as illustrated in FIG. 9b, comprise processing means, such as a processor 903, e.g. a CPU, and a memory 904 for storing or holding instructions. The memory would then comprise instructions, e.g. in form of a computer program 905, which when executed by the processing means 903 causes the network node 900 to perform the actions described above, e.g. with reference to FIGS. 1-2, 6 and 8.

Figure 9C:
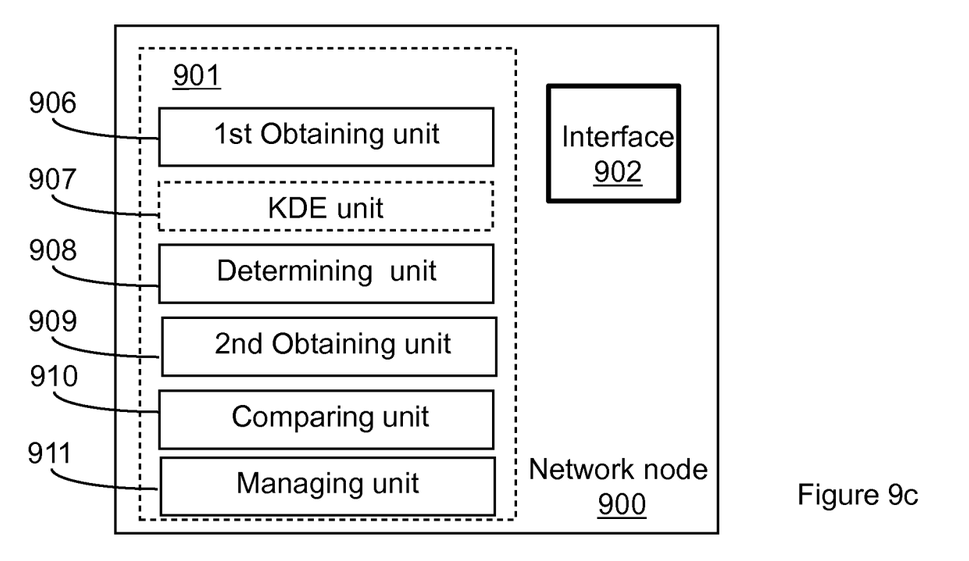

An alternative implementation of the processing circuitry 901 is shown in FIG. 9c. The processing circuitry here comprises a first obtaining unit 906, configured to cause the network node to obtain a first and a second type of alarms and their time of arrival from a set S of alarms collected in the communications network during a time period T. The processing circuitry further comprises a KDE unit 907, configured to cause the network node to apply Kernal Density Estimation on the respective first and second type of alarms, by applying a distribution function to each occurrence of the first type of alarms; thus obtaining a distribution function for the first type of alarms over the time period. The processing circuitry further comprises a determining unit 908, configured to cause the network node to determine a maximum correlation between the distribution function for the first type of alarms and the distribution function for the second type of alarms, and determining the time shift between the distribution functions associated with the maximum correlation. The processing circuitry further comprises a second obtaining unit 909, configured to cause the network node to obtain an indication of a mutual relation between the first and second type of alarms based on the maximum correlation and the time shift. The processing circuitry further comprises a comparing unit 910, configured to cause the network node to compare the obtained indication with at least a first threshold. The processing circuitry further comprises a managing unit 911, configured to cause the network node to manage the alarm types based on the comparison. The processing circuitry could comprise further units, such as a matrix unit for creating and updating temporary and/or stable (more long term) matrices based on correlations between different alarm types, e.g. from different time periods T.

The network nodes described above could be configured for the different method embodiments described herein.

The network node 900 may be assumed to comprise further functionality, for carrying out regular node functions.

The steps, functions, procedures, modules, units and/or blocks described herein may be implemented in hardware using any conventional technology, such as discrete circuit or integrated circuit technology, including both general-purpose electronic circuitry and application-specific circuitry.

Particular examples include one or more suitably configured digital signal processors and other known electronic circuits, e.g. discrete logic gates interconnected to perform a specialized function, or Application Specific Integrated Circuits (ASICs).

Alternatively, at least some of the steps, functions, procedures, modules, units and/or blocks described above may be implemented in software such as a computer program for execution by suitable processing circuitry including one or more processing units. The software could be carried by a carrier, such as an electronic signal, an optical signal, a radio signal, or a computer readable storage medium before and/or during the use of the computer program in the network nodes. The network node described above may be implemented in a so-called cloud solution, referring to that the implementation may be distributed, and the network node and indexing server therefore may be so-called virtual nodes or virtual machines.

The flow diagram or diagrams presented herein may be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

Examples of processing circuitry includes, but is not limited to, one or more microprocessors, one or more Digital Signal Processors, DSPs, one or more Central Processing Units, CPUs, and/or any suitable programmable logic circuitry such as one or more Field Programmable Gate Arrays, FPGAs, or one or more Programmable Logic Controllers, PLCs. That is, the units or modules in the arrangements in the different nodes described above could be implemented by a combination of analog and digital circuits, and/or one or more processors configured with software and/or firmware, e.g. stored in a memory. One or more of these processors, as well as the other digital hardware, may be included in a single application-specific integrated circuitry, ASIC, or several processors and various digital hardware may be distributed among several separate components, whether individually packaged or assembled into a system-on-a-chip, SoC.

It should also be understood that it may be possible to re-use the general processing capabilities of any conventional device or unit in which the proposed technology is implemented. It may also be possible to re-use existing software, e.g. by reprogramming of the existing software or by adding new software components.

The embodiments described above are merely given as examples, and it should be understood that the proposed technology is not limited thereto. It will be understood by those skilled in the art that various modifications, combinations and changes may be made to the embodiments without departing from the present scope. In particular, different part solutions in the different embodiments can be combined in other configurations, where technically possible.

When using the word "comprise" or "comprising" it shall be interpreted as non-limiting, i.e. meaning "consist at least of".

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts.

It is to be understood that the choice of interacting units, as well as the naming of the units within this disclosure are only for exemplifying purpose, and nodes suitable to execute any of the methods described above may be configured in a plurality of alternative ways in order to be able to execute the suggested procedure actions.

It should also be noted that the units described in this disclosure are to be regarded as logical entities and not with necessity as separate physical entities.

REFERENCES

[1] CCITT, Recommendation x.733—Information technology—open system interconnection—systems management:alarm reporting function. 1992.
[2] Intelligent alarm filtering in a telecommunications network U.S. Pat. No. 6,239,699 B1
[3] Filtering approach for network system alarms U.S. Pat. No. 7,389,345 B1
[4] Yangyang Wu, Shuguang, Du Wei Luo, Mining Alarm Database of Telecommunication Network for Alarm Association Rules. 11th Pacific Rim International Symposium on Dependable Computing, 2005.

The invention claimed is:

1. A method for handling alarms in a communications network, the method comprising a network node:
for a set S of alarms collected in the communications network during a time period T:
obtaining a first type of alarms and their time of arrival from the set;
applying Kernel Density Estimation on the first type of alarms, by applying a distribution function to each occurrence of the first type of alarms, thereby obtaining a distribution function for the first type of alarms over the time period T;
obtaining a second type of alarms and their time of arrival from the set S;
applying Kernel Density Estimation on the second type of alarms, by applying a distribution function to each occurrence of the second type of alarms, thereby obtaining a distribution function for the second type of alarms over the time period T;
determining a maximum correlation between the distribution function for the first type of alarms and the distribution function for the second type of alarms;
determining a time shift between the distribution function for the first type of alarms and the distribution function for the second type of alarms associated with the maximum correlation;
obtaining an indication of a mutual relation between the first and second types of alarms based on the maximum correlation and the time shift; comparing the obtained indication with at least a first threshold; and
managing the alarm types based on the comparison.

2. The method of claim 1, wherein the distribution function applied to each occurrence of the alarms is a Gaussian distribution function.

3. The method of claim 1, further comprising updating a correlation matrix related to a plurality of alarm types occurring in the communication system based on the obtained indication.

4. The method of claim 1, further comprising:
obtaining indications of a mutual relation between pairs of other alarm types based on a maximum correlation between a distribution function for the respective alarm types in each pair, and a time shift between the distribution functions associated with the maximum correlation;
wherein the other alarm types and their time of arrival are derived from a set S1, and the distribution functions are derived by applying of a Kernel Density Estimation for the respective alarm types in each pair, by applying of a distribution function to each occurrence of the respective types of alarms and obtaining a respective distribution function for each type of alarm over the time period T.

5. The method of claim 4, further comprising updating a correlation matrix based on the obtained indications of a mutual relation between the pairs of other alarm types.

6. The method of claim 1, further comprising:
for a second set S2 of alarms collected in the communications network during a time period T2:
repeating the obtaining of alarm types, the applying of Kernel Density Estimation and the obtaining of the indication, but for the time period T2; and
updating a correlation matrix based on the indication obtained for time period T2.

7. A network node for handling alarms in a communications network, the network node comprising:
processing circuitry;
memory containing instructions executable by the processing circuitry whereby the network node is operative to:
obtain a first type of alarms and their time of arrival from a set S of alarms collected in the communications network during a time period T;
apply Kernel Density Estimation on the first type of alarms, by applying a distribution function to each occurrence of the first type of alarms, thereby obtaining a distribution function for the first type of alarms over the time period T;
obtain a second type of alarms and their time of arrival from the set S;
apply Kernel Density Estimation on the second type of alarms, by applying a distribution function to each occurrence of the second type of alarms, thereby obtaining a distribution function for the second type of alarms over the time period T;
determine a maximum correlation between the distribution function for the first type of alarms and the distribution function for the second type of alarms;
determine a time shift between the distribution function for the first type of alarms and the distribution function for the second type of alarms associated with the maximum correlation;
obtain an indication of a mutual relation between the first and second types of alarms based on the maximum correlation and the time shift;
compare the obtained indication with at least a first threshold; and
manage the alarm types based on the comparison.

8. The network node of claim 7, wherein the distribution function applied to each occurrence of the alarms is a Gaussian distribution function.

9. The network node of claim 7, wherein the instructions are such that the network node is operative to manage the alarm types by assigning the first type and the second type of alarms to the same group of alarms or to different groups of alarms based on the obtained indication.

10. The network node of claim 7, wherein the different types of alarms are defined by different combinations of alarm properties.

11. The network node of claim 10, wherein the alarm properties comprise one or more of: error code, concerned node, concerned object, problem description, or other additional information associated with the alarm.

12. The network node of claim 7:
wherein the different types of alarms are defined based on a text representation of alarm properties of each alarm; and
wherein each alarm is transformed from a text representation into a numerical representation.

13. The network node of claim 7, wherein the instructions are such that the network node is operative to update a correlation matrix related to a plurality of alarm types occurring in the communication system based on the obtained indication.

14. The network node of claim 7, wherein the instructions are such that the network node is operative to:
obtain indications of a mutual relation between pairs of other alarm types based on a maximum correlation between a distribution function for the respective alarm types in each pair, and a time shift between the distribution functions associated with the maximum correlation;
wherein the other alarm types and their time of arrival are derived from a set S1, and the distribution functions are derived by applying of a Kernel Density Estimation for the respective alarm types in each pair, by applying of a distribution function to each occurrence of the respective types of alarms and obtaining a respective distribution function for each type of alarm over the time period T.

15. The network node of claim 14, wherein the pairs are created by cyclic permutations of alarm types from a group of alarm types.

16. The network node of claim 14, wherein the instructions are such that the network node is operative to update a correlation matrix based on the obtained indications of a mutual relation between the pairs of other alarm types.

17. The network node of claim 7, wherein the instructions are such that the network node is operative to:
for a second set S2 of alarms collected in the communications network during a time period T2:
repeat the obtaining of alarm types, the applying of Kernel Density Estimation and the obtaining the indication, but for the time period T2; and
update a correlation matrix based on indication obtained for the time period T2.

18. The network node of claim 7, wherein the instructions are such that the network node is operative to manage the alarm types by one or more of:
renaming or redesigning a representation of alarms of alarm types associated with an indication of a mutual relation that meets a first threshold, such that they have a common property;
grouping alarm types associated with an indication of mutual relation meeting a second threshold;
turning off alarms of alarm types found to be redundant given an indication of a mutual relation that meets a third threshold; and
selecting a troubleshooting strategy based on at least one obtained indication that meets a fourth threshold.

19. A non-transitory computer readable recording medium storing a computer program product for handling alarms in a communications network, the computer program product comprising software instructions which, when run on processing circuitry of a network node, causes the network node to:
for a set S of alarms collected in the communications network during a time period T:
obtain a first type of alarms and their time of arrival from the set;
apply Kernel Density Estimation on the first type of alarms, by applying a distribution function to each occurrence of the first type of alarms, thereby obtaining a distribution function for the first type of alarms over the time period T;
obtain a second type of alarms and their time of arrival from the set S;
apply Kernel Density Estimation on the second type of alarms, by applying a distribution function to each occurrence of the second type of alarms, thereby obtaining a distribution function for the second type of alarms over the time period T;
determine a maximum correlation between the distribution function for the first type of alarms and the distribution function for the second type of alarms;
determine a time shift between the distribution function for the first type of alarms and the distribution function for the second type of alarms associated with the maximum correlation;
obtain an indication of a mutual relation between the first and second types of alarms based on the maximum correlation and the time shift;
compare the obtained indication with at least a first threshold; and
manage the alarm types based on the comparison.

* * * * *